UNITED STATES PATENT OFFICE.

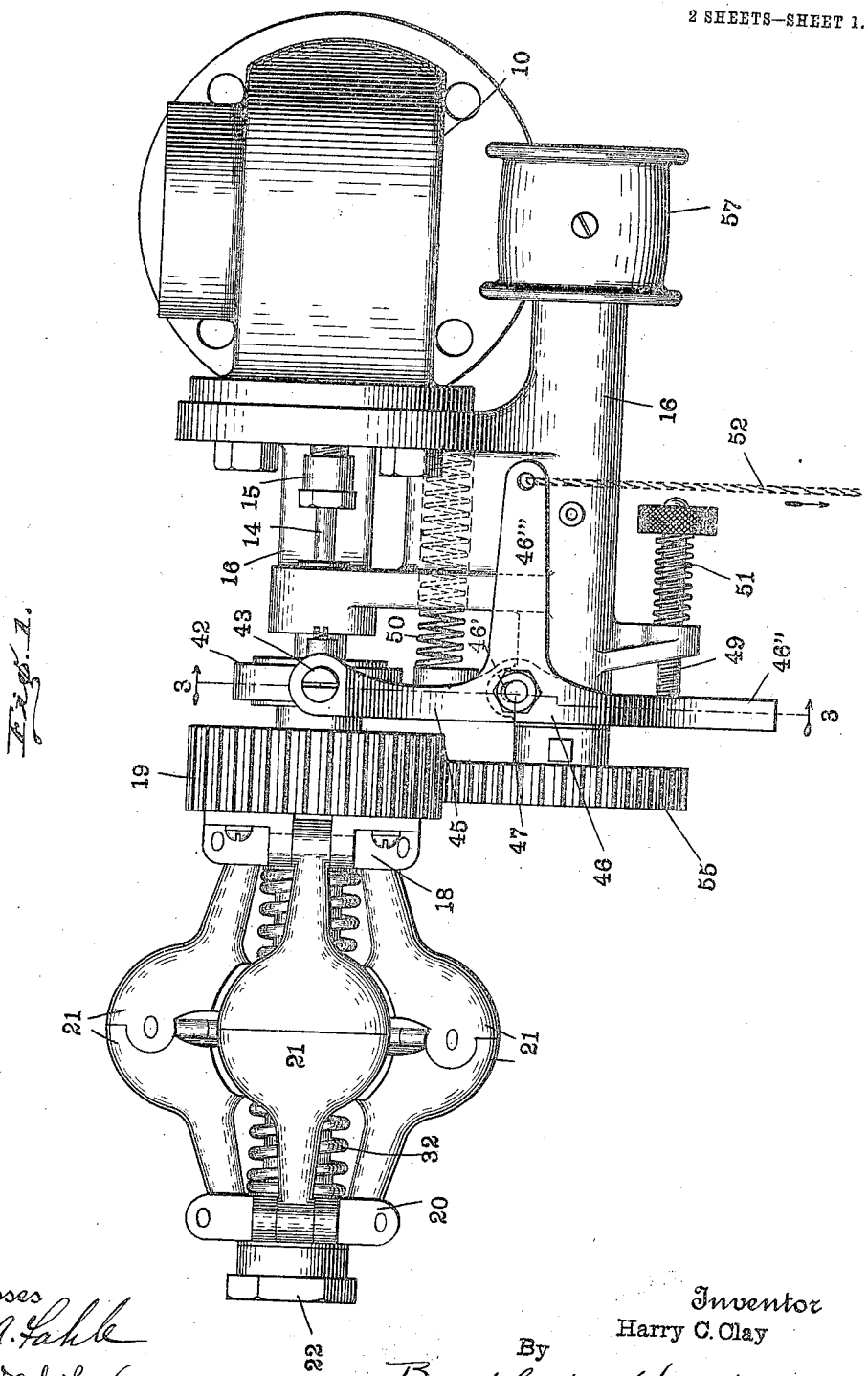

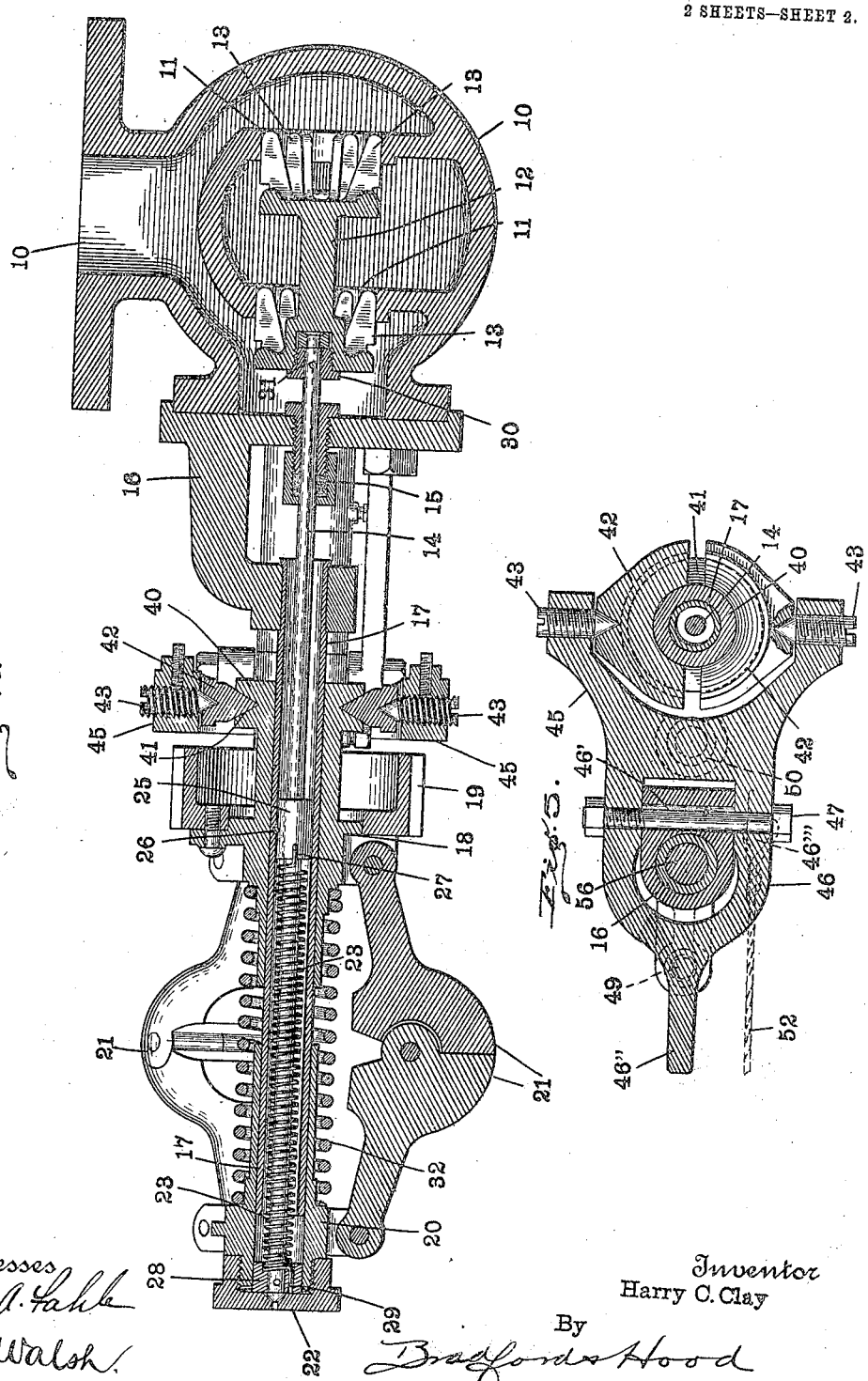

HARRY C. CLAY, OF COLUMBUS, INDIANA, ASSIGNOR TO REEVES & COMPANY, OF COLUMBUS, INDIANA, A CORPORATION OF INDIANA.

THROTTLING-GOVERNOR.

No. 813,037.   Specification of Letters Patent.   Patented Feb. 20, 1906.

Application filed August 25, 1905. Serial No. 275,734.

*To all whom it may concern:*

Be it known that I, HARRY C. CLAY, a citizen of the United States, residing at Columbus, in the county of Bartholomew and State of Indiana, have invented certain new and useful Improvements in Throttling-Governors, of which the following is a specification.

The object of my invention is to produce a throttling-governor of very few parts, the structure being such, however, as to be economical of construction and such that the adjustment of the governor-valve in order to attain different governing speeds may be accomplished by an adjustment of the entire ball-head and also such that the sawyer's lever may operate to throw the valve closed by operating directly upon the ball-head instead of operating directly upon the valve-stem, as has heretofore been customary.

A further object of my invention is to provide such improvements in details of construction as shall be hereinafter pointed out.

The accompanying drawings illustrate my invention.

Figure 1 is a plan; Fig. 2, a horizontal axial section, and Fig. 3 a section of line 3 3 of Fig. 1.

In the drawings, 10 indicates a governor-body of any well-known form having the two valve-openings 11 for the balanced valve 12, said valve being preferably provided with extra long wings 13 in order to hold the valve central throughout its range of movement. The valve 12 is provided with a comparatively light continuous valve-stem 14, which passes through a suitable stuffing-box 15 in the head 16, attached to the body 10 in the usual manner. Head 16 has secured to it in alinement with the stem 14 a tubular spindle 17, the length of which is somewhat less than the length of the stem 14, said stem passing entirely through the spindle. Journaled upon the spindle 17 is the inner ball-spider 18, to which is secured a spur-gear 19 of considerable width of face. Journaled upon the outer end of spindle 17 is the outer ball-spider 20, and the ball members 21 are pivotally attached to these two spiders 18 and 20 in a usual and well-known manner. The outer end of the spider 20 is closed by a cap 22, against which the outer end of the valve-stem 14 engages, being yieldingly held in engagement therewith by means of a light spring 23, which is arranged within the spindle 17 around the valve-stem. In order to prevent the valve-stem and attached valve from turning, I secure within the spindle 17 a sleeve 25, through which the stem 14 passes freely. Said sleeve is attached to the spindle 17 by any suitable means—as, for instance, a tangential pin 26. The inner end of spring 23 is turned axially, so as to enter an axial slot 27, formed in sleeve 25. Pinned to the outer end of stem 14 is a collar 28, which fits nicely within the bore of spider 20, but is capable of reciprocation therein. Collar 28 is provided with a hole 29, substantially parallel with the stem 14, and this hole is adapted to receive the turned end of the outer end of spring 23, the spring 23 thus serving torsionally to prevent material turning of the valve 12 and its stem 14.

The valve 12 is attached to the inner end of stem 14 by means which normally prevents any turning of the valve upon the stem. For convenience and economy of construction this means consists of a threaded nut 30, pinned to stem 14 by a pin 31, which passes through the nut in its threaded portion, so that when valve 12 is screwed upon the nut 30 it will prevent transverse displacement of the pin, and thus prevent accidental separation of the parts.

Arranged between the two spiders 18 and 20 around the spindle 17 is the usual governor-spring 32, which serves to yieldingly resist the centrifugal action of the governor members 21 in a usual well-known manner.

I shall hereinafter refer to the spiders 18 and 20, ball members 21, and spring 32 as the "ball-head." In order to adjust this ball-head in such manner as to adjust the position of the valve relative to its seats to vary the normal governing speed of the governor, the spider 18 is provided with a flange 40, which is provided, preferably, with a V-shaped peripheral groove 41, adapted to receive a ring 42, the interior of which is correspondingly V-shaped to fit the groove. The ring 42 is composed of two separable halves, each of which is held in position by one of a pair of pivot-screws 43, which screws are arranged opposite each other in the yoke 45 of the sawyer's lever 46. Said pivot-screws 43 each serve not only as a pivot for one of the ring members 42, but also serve to hold said ring members together and being adjustable are capable of taking up the wear of the ring members 42 and groove 41. The sawyer's lever 46 is pivotally mounted on a pin 47, carried by a head 16, the said pin passing through a hole 46' in the head 16, which hole is slightly oblong in order to permit the necessary straight-line movement of the ring members 42. The sawyer's lever is yieldingly held with its arm 46'' against an adjusting-screw 49 by means of a spring 50, and in the drawings I have shown a spring 51 surrounding the adjusting-screw 49 in order to prevent its accidental displacement from any desired adjustment. The sawyer's lever may be operated by hand by taking hold of the end 46''; but when the governor is arranged horizontally, as is customary with traction-engines, I find it exceedingly convenient to provide the sawyer's lever with an arm 46''', which lies in a substantially horizontal plane and parallel to the valve-stem, so that an operating-cable 52 may run from said arm directly to the engineer, so that a direct pull upon the cable 52 will serve to operate it. It will be understood, of course, that the arm 46''' will be useful in operating the sawyer's lever, even though the governor is not used in a horizontal plane. The ball-head is rotated by means of a gear 55, which meshes with a gear 19 and is carried by a shaft 56, journaled in a suitable bearing in head 16, parallel with the valve-stem 14, and provided with the usual belt-pulley 57.

In operation screw 49 is adjusted until the lever 46 is swung to a point where it will hold the ball-head in such position that when the desired speed of the engine has been reached the balls of the ball-head will have been moved outwardly by a centrifugal force to such point as to cause the valve 12 to have been moved thereby toward its seats to its working position. If a different governing speed is desired, the ball-head will be moved bodily by an adjustment of the screw 49 to such new position that the desired speed of the engine will be required to bring the governor-balls to such expanded position as to bring the valve to its working position.

It will be noticed that the valve-stem, although in one piece, is entirely inclosed within the spindle and ball-head and need not be provided with any length adjustment means, the adjustment of the valve with relation to its seats being accomplished wholly by the adjustment of the entire ball-head on the spindle.

I claim as my invention—

1. In a throttling-governor, the combination, with the main body, and its valve-seats, a valve mounted therein in conjunction with said seats, a valve-stem carrying said valve, a rotatable ball-head engaging said stem, means for rotating said ball-head, whereby variation in speed of rotation thereof will cause movement of the valve, and means for adjusting said ball-head bodily whereby the normal position of the valve relative to its seats may be varied.

2. In a throttling-governor, the combination, with the main body, and the valve and its stem, of a hollow spindle carried by said main body through which the valve-stem passes, a ball-head journaled on said spindle and bodily axially movable thereon, means for rotating the ball-head, and means for adjusting the ball-head bodily longitudinally on the spindle whereby the valve may be adjusted within the governor-body.

3. In a throttling-governor, the combination, with the main body, and the valve and its stem, of a hollow spindle carried by said main body through which the valve-stem passes, a ball-head journaled on said spindle and bodily axially movable thereon, means for rotating the ball-head, means for adjusting the ball-head bodily longitudinally on the spindle whereby the valve may be adjusted within the governor-body, and means for preventing rotative movement of the valve-stem.

4. In a throttling-governor, the combination, with the main body, and its valve-seats, a valve mounted therein in conjunction with said seats, a valve-stem carrying said valve, a rotatable ball-head engaging said stem, means for rotating said ball-head, whereby variation in speed of rotation thereof will cause movement of the valve, means for adjusting said ball-head bodily whereby the normal position of the valve relative to its seats may be varied, a special spring yieldingly holding the valve-stem in engagement with the ball-head, and attached at one end to the governor-body and at the other end to the valve-stem to prevent rotation of the valve.

5. In a throttling-governor, the combination, with the main body, and the valve and its stem, of a hollow spindle carried by said main body through which the valve-stem passes, a ball-head journaled on said spindle and bodily axially movable thereon, means for rotating the ball-head, means for adjusting the ball-head bodily longitudinally on the spindle whereby the valve may be adjusted within the governor-body, a sleeve 25 arranged within the sleeves and attached thereto, a collar carried by the valve-stem, and a spiral spring arranged around the valve-stem within the spindle, one end of said spring entering the sleeve and the other end entering the collar, substantially as and for the purpose set forth.

6. In a throttling-governor, the combination, with the main body, and the valve and its stem, of a hollow spindle carried by said main body through which the valve-stem passes, a ball-head journaled on said spindle and bodily axially movable thereon, means for rotating the ball-head, a sawyer's lever, intermediate connections between said lever and ball-head, adjustable means for holding said lever in one direction, and yielding means for holding said lever in the opposite direction.

7. In a throttling-governor, the combination, with the main body, and the valve and its stem, of a hollow spindle carried by said main body through which the valve-stem passes, a ball-head journaled on said spindle and bodily axially movable thereon, means for rotating the ball-head, a sawyer's lever, a split collar having rotatable engagement with the inner member of the ball-head, a pair of pivot-pins carried by the sawyer's lever and engaging the members of the split collar to hold them in position, adjustable means for holding the sawyer's lever in one direction, and yielding means for holding said lever in the opposite direction.

8. In a throttling-governor, the combination, with the main body and the valve and its stem, of a hollow spindle carried by said main body through which the valve-stem passes, a pair of ball-spiders journaled on said spindle and axially movable thereon, a spur-gear carried by one of said spiders, a driving-gear meshing with said spur-gear, ball members connecting said spindles, a spring acting on said spiders, and means for adjusting the spiders axially on the spindle.

9. In a throttling-governor, the combination, with the main body and the valve and its stem, of a hollow spindle carried by said main body through which the valve-stem passes, a pair of ball-spiders journaled on said spindle and axially movable thereon, a spur-gear carried by one of said spiders, a driving-gear meshing with said spur-gear, ball members connecting said spiders, a spring acting on said spiders, a sawyer's lever, intermediate connections between said lever and ball-head, adjustable means for holding said lever in one direction, and yielding means for holding said lever in the opposite direction.

10. In a throttling-governor, the combination, with the main body and the valve and its stem, of a hollow spindle carried by said main body through which the valve-stem passes, a pair of ball-spiders journaled on said spindle and axially movable thereon, a spur-gear carried by one of said spiders, a driving-gear meshing with said spur-gear, ball members connecting said spiders, a spring acting on said spiders, a sawyer's lever, a split collar having rotatable engagement with the inner member of the ball-head, a pair of pivot-pins carried by the sawyer's lever and engaging the members of the split collar to hold them in position, adjustable means for holding the sawyer's lever in one direction, and yielding means for holding said lever in the opposite direction.

In witness whereof I have hereunto set my hand and seal, at Indianapolis, Indiana, this 11th day of August, A. D. 1905.

HARRY C. CLAY. [L. S.]

Witnesses:
ARTHUR M. HOOD,
JAMES A. WALSH.